(12) United States Patent
Nakhamkin

(10) Patent No.: US 8,011,189 B2
(45) Date of Patent: Sep. 6, 2011

(54) RETROFIT OF SIMPLE CYCLE GAS TURBINE FOR COMPRESSED AIR ENERGY STORAGE APPLICATION HAVING EXPANDER FOR ADDITIONAL POWER GENERATION

(76) Inventor: Michael Nakhamkin, Basking Ridge, NJ (US)

( * ) Notice: Subject to any disclaimer, the term of this patent is extended or adjusted under 35 U.S.C. 154(b) by 57 days.

(21) Appl. No.: 12/632,841

(22) Filed: Dec. 8, 2009

(65) Prior Publication Data

US 2010/0083660 A1 Apr. 8, 2010

Related U.S. Application Data

(60) Continuation-in-part of application No. 12/582,720, filed on Oct. 21, 2009, which is a division of application No. 12/285,404, filed on Oct. 3, 2008, now Pat. No. 7,614,237, which is a continuation-in-part of application No. 12/216,911, filed on Jul. 11, 2008, now abandoned, which is a continuation of application No. 12/076,689, filed on Mar. 21, 2008, now Pat. No. 7,406,828, which is a division of application No. 11/657,661, filed on Jan. 25, 2007, now abandoned.

(51) Int. Cl.
F02C 1/00 (2006.01)
(52) U.S. Cl. .................. 60/772; 60/39.183; 60/727
(58) Field of Classification Search .............. 60/39.15, 60/39.181, 39.183, 726, 727, 728, 772
See application file for complete search history.

(56) References Cited

U.S. PATENT DOCUMENTS

| | | | |
|---|---|---|---|
| 3,631,673 A * | 1/1972 | Charrier et al. ............. 60/39.183 |
| 4,358,250 A | 11/1982 | Payne |
| 4,872,307 A | 10/1989 | Nakhamkin |
| 4,885,912 A | 12/1989 | Nakhamkin |
| 5,181,376 A | 1/1993 | Rao |
| 5,442,904 A | 8/1995 | Shnaid |
| 5,491,969 A | 2/1996 | Cohn et al. |

(Continued)

FOREIGN PATENT DOCUMENTS

DE 102004040890 A1 3/2005

(Continued)

OTHER PUBLICATIONS

PCT Search Report & Written Opinion in PCT/US2010/054382 dated Dec. 17, 2010.

*Primary Examiner* — Louis Casaregola
(74) *Attorney, Agent, or Firm* — Manelli Selter PLLC; Edward J. Stemberger

(57) ABSTRACT

A Compressed Air Energy Storage (CAES) system includes a first combustion turbine assembly (42) having a shaft (52) coupled to a motor (54), a compressor (44) and a debladed turbine element (46). A second combustion turbine assembly (68) has a shaft (74) coupled to an electrical generator (80), a turbine (70) and a debladed compressor (72). A first interconnection (58) is from an output of the compressor (44) of the first combustion turbine assembly to an air storage (66). A second interconnection (87) is from the air storage to the turbine (70) of the second combustion turbine assembly for producing power. An expander (88) and an electrical generator (94) are provided. A third interconnection (90) is from the air storage (66) to the expander (88). A source of heat preheats compressed air in the third interconnection. A fourth interconnection (96) is from the expander to the turbine (70).

9 Claims, 4 Drawing Sheets

U.S. PATENT DOCUMENTS

| | | |
|---|---|---|
| 5,537,822 A | 7/1996 | Shnaid et al. |
| 5,934,063 A | 8/1999 | Nakhamkin |
| 6,305,158 B1 | 10/2001 | Nakhamkin |
| 6,745,569 B2 | 6/2004 | Gerdes |
| 7,150,154 B2 * | 12/2006 | Althaus et al. ................ 60/727 |
| 7,500,349 B2 | 3/2009 | Alhaus |
| 2003/0131599 A1 | 7/2003 | Gerdes |
| 2008/0178602 A1 | 7/2008 | Nakhamkin |
| 2008/0272597 A1 | 11/2008 | Althaus |
| 2009/0100835 A1 | 4/2009 | Nakhamkin |
| 2009/0178384 A1 | 7/2009 | Nakhamkin |
| 2010/0251712 A1 * | 10/2010 | Nakhamkin .................... 60/659 |

FOREIGN PATENT DOCUMENTS

| | | |
|---|---|---|
| RU | 2029119 C1 | 2/1995 |
| SU | 383859 A | 8/1973 |
| WO | 199222741 A1 | 12/1992 |

* cited by examiner

RETROFIT OF SIMPLE CYCLE GAS TURBINE FOR COMPRESSED AIR ENERGY STORAGE APPLICATION HAVING EXPANDER FOR ADDITIONAL POWER GENERATION

This application is a continuation-in-part of U.S. application Ser. No. 12/582,720, filed on Oct. 21, 2009, which is a division of U.S. application Ser. No. 12/285,404, filed on Oct. 3, 2008, now U.S. Pat. No. 7,614,237 which is a continuation-in-part of U.S. application Ser. No. 12/216,911 filed on Jul. 11, 2008, abandoned, which is a continuation of U.S. application Ser. No. 12/076,689, filed on Mar. 21, 2008, now U.S. Pat. No. 7,406,828, which is a division of U.S. application Ser. No. 11/657,661, filed on Jan. 25, 2007, abandoned.

TECHNICAL FIELD

This invention relates to a Compressed Air Energy Storage (CAES) system and, more particularly, to a CAES system that provides improved performance as compared to conventional CAES systems.

With reference to FIG. 1, U.S. Pat. No. 4,872,307 is based on the utilizing two combustion turbine assemblies. One combustion turbine assembly 10 has a debladed turbine or expander 12 and is practically converted into a low pressure compressor 14 driven by a motor 15. The second combustion turbine assembly 16 has a debladed compressor 18 and is practically converted into a turbine 20 with double the combustion turbine power driving an electric generator 22. An auxiliary compressor 24, driven by motor 25, is provided to, in addition to compressor 14, charge the air storage 26 at an optimized maximum pressure. The air storage 26 stores compressed air when off-peak energy is stored in the form of compressed air energy.

During off-peak hours, the electric generator/motor driven compressor 14 of first combustion turbine assembly 10 with debladed turbine 12, and motor-driven auxiliary compressor 24 utilize available energy and convert it into the energy of the compressed air stored in the air storage 26. During peak hours, the compressed air is withdrawn from the air storage 26 and is directed to the combustor associated with turbine 20 of the second combustion turbine assembly 16 to produce power.

U.S. Pat. No. 4,872,307 thus provides a power system that uses a plurality of modified combustion turbine assemblies along with additional equipment to provide a CAES system. Although this conventional CAES system is effective, there is a need to further modify this system to provide increased performance and operational flexibility.

SUMMARY

An object of the invention is to fulfill the needs referred to above. In accordance with an embodiment of the invention this objective is fulfilled by a method that provides a Compressed Air Energy Storage (CAES) system based on first and second combustion turbine assemblies. The method provides a first combustion turbine assembly having a debladed turbine element, a compressor, and a generator/motor for driving the compressor. Compressed air from an outlet of the compressor communicates with air storage, preferably via and auxiliary compressor, instead of with the turbine element. A second combustion turbine assembly has a debladed compressor, a combustor, a turbine associated with the combustor, and a generator associated with the turbine. Compressed air from the air storage communicates directly with the combustor upstream of the turbine of the second combustion turbine assembly instead of with air from the compressor of the second combustion turbine assembly so that the turbine can expand the compressed air from the air storage to produce electrical power via the generator without any reduction in power since the compressor of the second combustion turbine assembly is not driven. An additional expander and an additional generator associated with the expander are provided. The method ensures that compressed air from the air storage can be preheated and then can communicate with the expander, in addition to directly communicate with the combustor and thus the turbine of the second combustion turbine assembly, and ensures that airflow from the expander can communicate with the combustor and thus the turbine of the second turbine assembly, so that the additional expander can expand the preheated compressed air to produce electrical power via the additional generator, in addition to the electrical power produced by the generator of the second combustion turbine assembly.

In one embodiment, a portion of airflow from the expander can be extracted and injected upstream of the combustor of the second combustion turbine assembly and the expander can expand the preheated compressed air to atmospheric pressure.

In another embodiment, all exhaust airflow from the expander can be provided upstream of the combustor of the second combustion turbine assembly.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DESCRIPTION OF EXAMPLE EMBODIMENTS

Figure 2:
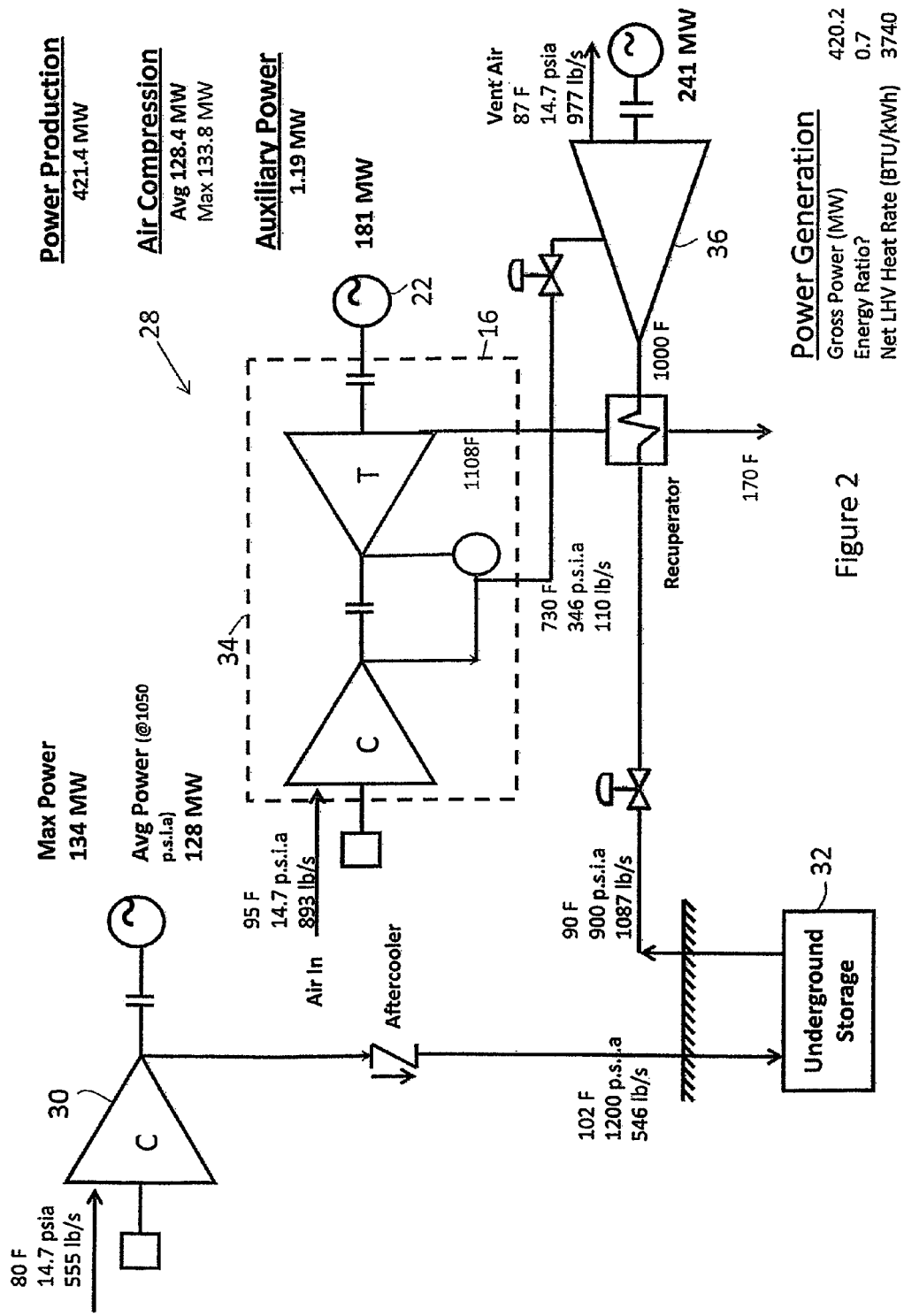
FIG. 2 is a view of a CAES system as disclosed in co-pending application Ser. No. 12/582,720 having an additional expander for additional power generation.

FIG. 2 shows a second generation CAES system, generally indicated at 28, from my co-pending patent application Ser. No. 12/582,720, the content of which is hereby incorporated into this specification by reference. In the system 28, a compressor 30 supplies compressed air to an air storage 32 during off-peak hours and, during peak hours, the stored compressed air is withdrawn from the air storage 32, is preheated by utilizing the exhaust gas heat of the combustion turbine 34, and then is directed into an expander 36 that generates the preheated compressed air power in addition to combustion turbine power.

The embodiments herein utilize features of my U.S. Pat. No. 4,872,307 (discussed above), the content of which is hereby incorporated by reference into this specification, and my co-pending application Ser. No. 12/582,720 to provide an improved CAES system.

Figure 3:
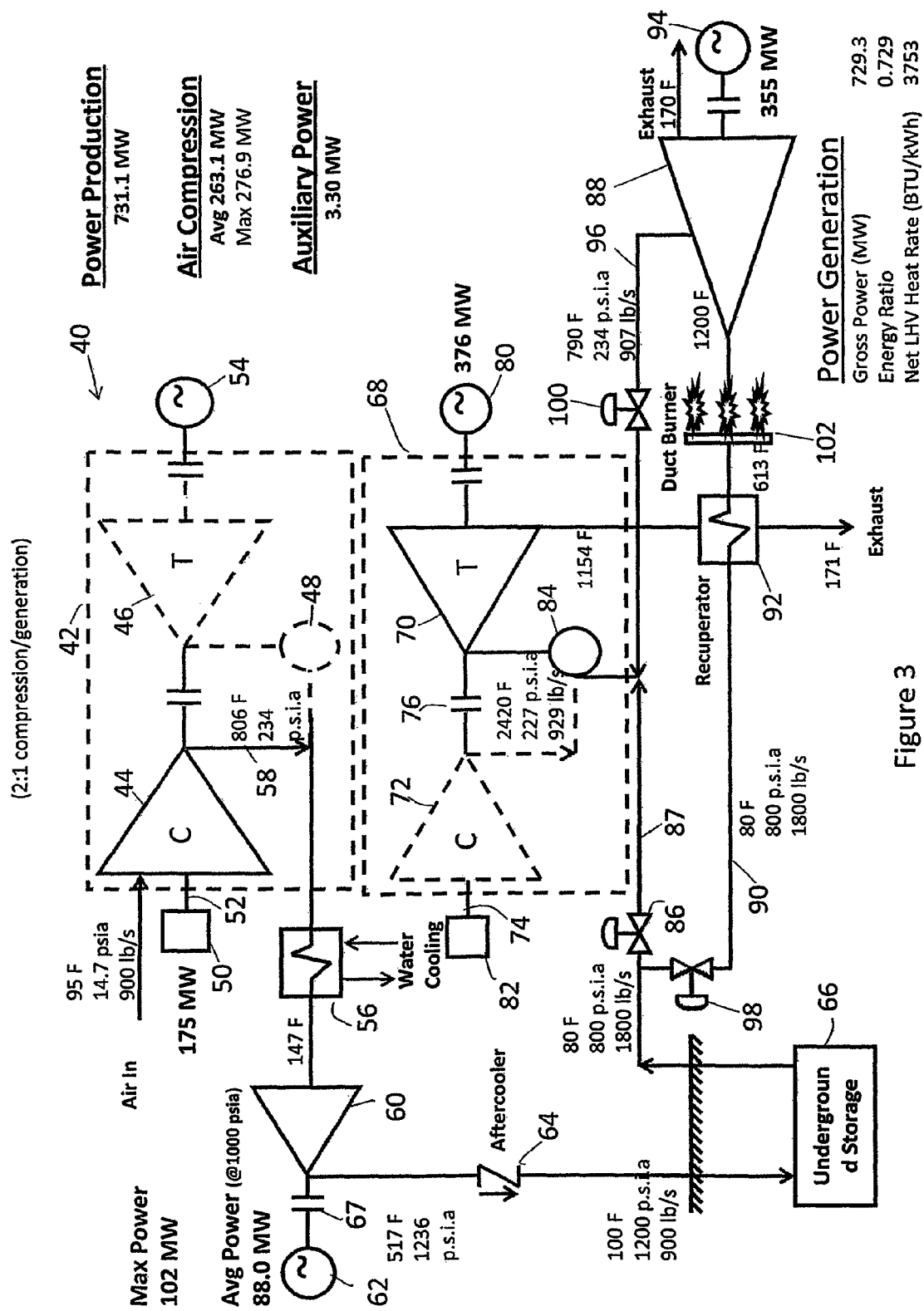
FIG. 3 is a CAES system provided in accordance with a first embodiment thereof.

With reference to FIG. 3, a CAES system is shown, generally indicated as 40, in accordance with an embodiment. The system 40 includes a first combustion turbine assembly, generally indicated as 42, having a compressor 44 receiving a source of inlet air and a turbine element 46 that is initially debladed since such turbine element is not to be utilized for the production of energy. Consequently, no fuel will be supplied to combustor 48 during this energy absorbing compression stage. In order to compensate for the axial loss of thrust balance due to deblading turbine element 46, an externally located additional thrust bearing 50 is installed on shaft 52. Shaft 52 serves to transmit rotational energy from a synchronous electrical generator/motor, illustratively, motor 54, to debladed turbine element 46, compressor 44 and thrust bearing 50.

A compressor discharge flange (not shown) is typically provided in the compressor of a conventional combustion turbine assembly to direct compressed air to combustor 48. However, in the embodiment, such compressed air input to combustor 48 is removed and the compressed air is directed to an intercooler 56 via interconnection 58.

In addition to the above modification to combustion turbine assembly 42, intercooler 56, a high pressure compressor 60, driven by motor 62, and an aftercooler 64 are provided to complete the compression train.

High pressure compressor 60 further compresses the air from compressor 44 which functions as a lower pressure compressor. High pressure compressor 60 is preferably driven through clutch 66 by motor 62. Alternatively, high pressure compressor 60 may be driven by motor 54.

Aftercooler 64 is provided to cool the compressed air exiting high pressure compressor 60 before entering the air storage 66. In the embodiment, the air storage 66 is preferably underground air storage such as a geological structure. Alternatively, the air storage can be an above-ground pressure vessel. Although in the embodiment, compressed air is preferably stored in the air storage 66, the compressed air can be converted into a liquid air and stored in the air storage 66. When needed, the liquid air can then be converted back to compressed air and used in the system 40.

The system 40 includes a second combustion turbine assembly, generally indicated at 68, that comprises a turbine 70 and a compressor 72 connected to a shaft 74. Clutch devices 76, 78 are provided in the combustion turbine assembly 68 for isolating compressor 72, turbine 70 and a gas turbine generator 80. Compressor 72 is initially debladed since such compressor is not to be utilized for the compression of air. In order to compensate for the axial loss of thrust balance due to deblading compressor 72, externally located additional thrust bearing 82 is installed on shaft 74. Shaft 74 serves to transmit rotational energy from turbine 70 to a synchronous electrical machine, illustratively, generator 80, debladed compressor 72, and thrust bearing 82.

In addition to the above modifications to the combustion turbine assembly 68, the compressed air output of compressor 72 which heretofore was input to combustor 84 is eliminated as a functional device. Further, a valve 86 and associated interconnection 87, such as piping, are placed between the combustor 84 and the air storage 66. Valve 86 and air storage 66 serve as a compressed air source for the combustor 84, in place of compressor 72.

The conventional combustion turbine assembly is ordinarily coupled to an electrical power generator of predetermined capacity. In accordance with the embodiment, the electrical generator of the conventional combustion turbine assembly is removed and replaced by an electrical generator 80 of approximately double capacity since combustion turbine assembly 68 has approximately twice its original output once the compressor is debladed. As a result, the CAES system 40 with a single generator outputs approximately the same power as the combined efforts of the two gas turbines each having its own generator, from which it was constructed.

Typically, compressed air is stored underground with the maximum pressure of 1200 psia and most often over 2500 psia, with a significant energy used for the ambient air compression and directed to the compressed air storage at this pressure. These pressures are much higher than the combustion turbine assembly's combustor/turbine inlet pressure of approximately 170-190 psia. Thus, the stored compressed air should be throttled from 1200 psia to 170-190 psia. However, such throttling results in the loss of a significant amount of compression energy.

In accordance with the embodiments, compression energy is used by an additional expander 88 provided in the system 40. With reference to FIG. 3, an inlet to the expander 88 is coupled with the outlet of the air storage 66 via interconnection 90 in the form of piping or the like. During off-peak hours, compressed air from an outlet of the motor driven additional compressor 60 charges the air storage 66.

During peak hours, in accordance with one option, compressed air is withdrawn from the air storage 66 at specific pressure and is routed through flow control and pressure reducing valve 86 to combustor 84 upstream of the turbine 70 instead of with air from the compressor 72. The combustor 84 combines the compressed air with a fuel and combusts the result to produce a hot gas that drives the turbine 70 connected to the generator 80 to produce electrical power without any reduction in power since compressor 72 is not driven. In addition or alternatively, compressed air is routed from the air storage 66 through flow control valve 98, is preheated in a recuperator 92 that utilizes the exhaust gas heat of turbine 70, or any other heat source, and is expanded through the green power generation expander 88 driving an electric generator 94 to produce additional electrical power. The expander 88 has air extraction via interconnection 96 and through valve 100 to supply the extracted air upstream of the combustor 84 at specific inlet pressure and flow parameters. The remaining airflow is expanded in the low pressure part of the expander 88 to the atmospheric pressure generating the additional green electrical power. A combustor or duct burner 102 can be provided for burning fuel to heat air that is expanded in expander 88.

Figure 4:
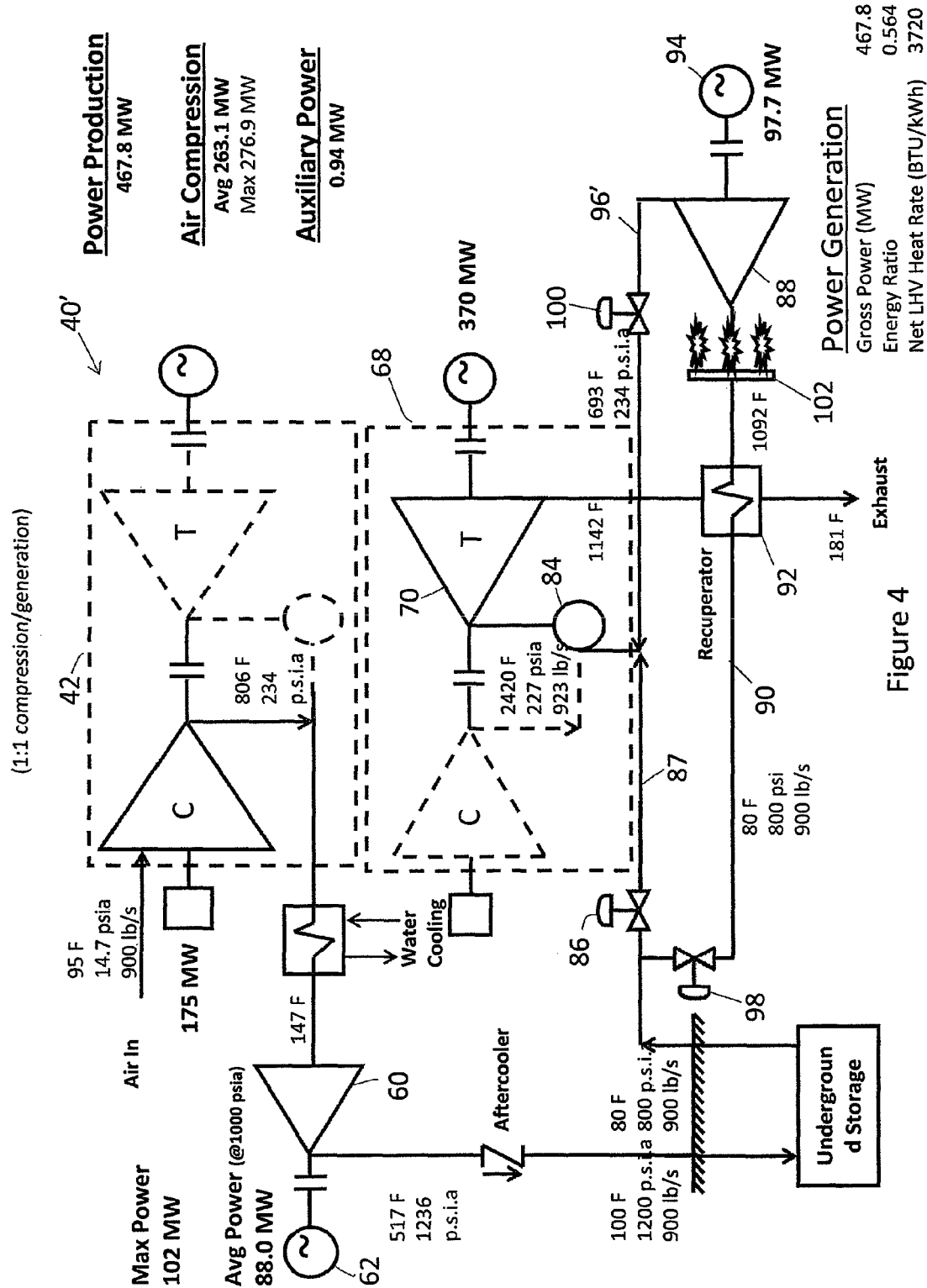
FIG. 4 is a CAES system provided in accordance with a second embodiment thereof.

FIG. 4 shows another embodiment of a CAES system, generally indicated at 40'. The system 40' is substantially similar to the system 40 of FIG. 3, with compressed air being withdrawn from the air storage 66 at specific pressure, being preheated in the recuperator 92 that utilizes the exhaust gas heat from turbine 70, or any other heat source, and expanded through the green power generation expander 88 driving the electric generator 94. However, all exhaust airflow of expander 88 is provided upstream of the combustor 84, via interconnection 96' and through valve 100, at specific inlet pressure and flow parameters.

Figure 1:
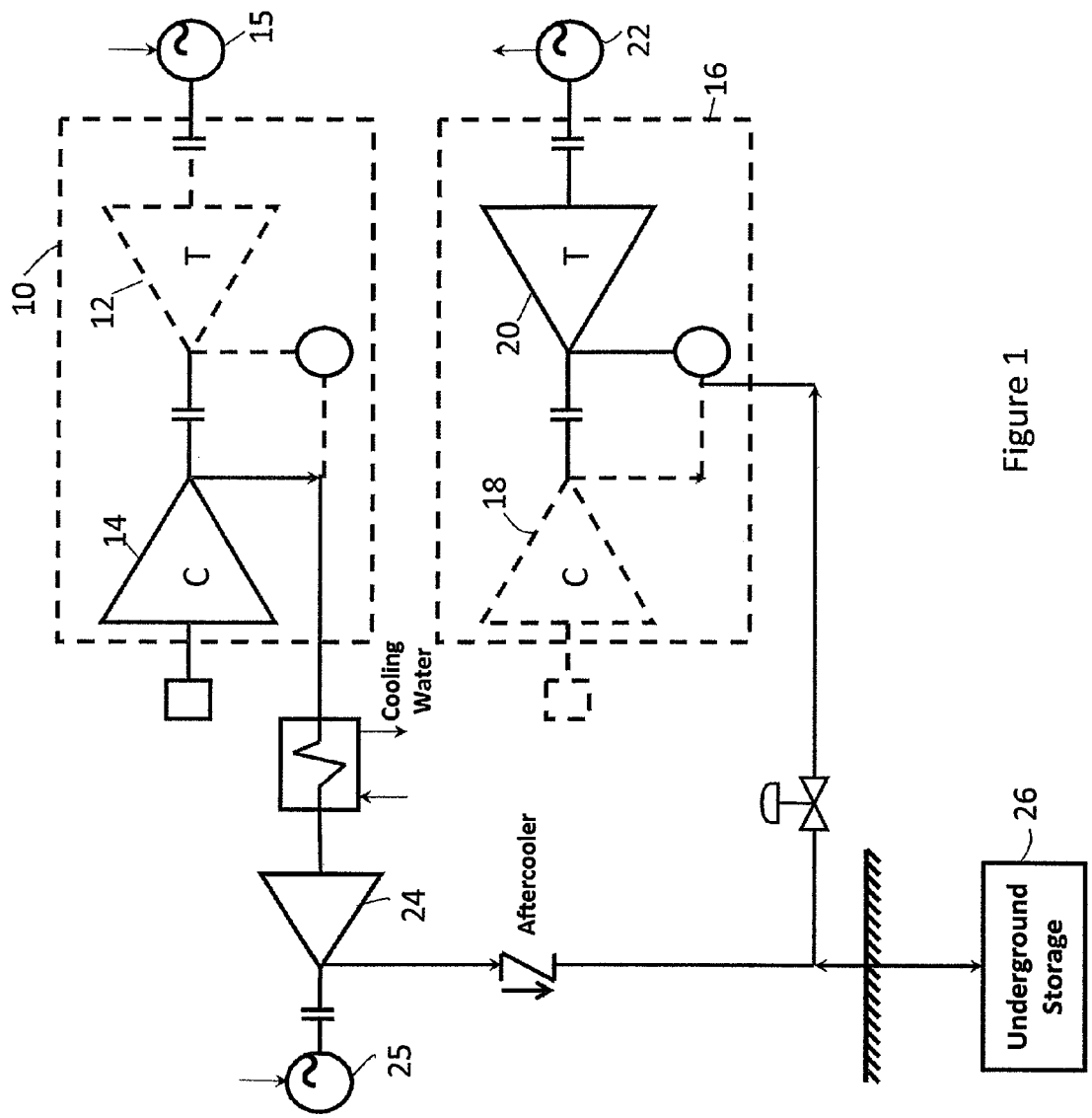
FIG. 1 is a view of a conventional CAES system as disclosed in U.S. Pat. No. 4,872,307.

Table 1 shows a summary of the performance characteristics of the system of U.S. Pat. No. 4,872,307 as shown in FIG. 1, the system of application Ser. No. 12/582,720 shown in FIG. 2, and the two embodiments, FIG. 3 and FIG. 4. This table indicates very significant performance improvements of the embodiments of FIGS. 3 and 4.

TABLE 1

| Performance Parameters | Embodiments | | | |
|---|---|---|---|---|
| | FIG. 1 | FIG. 2 | FIG. 3 | FIG. 4 |
| Power, MW | 374 | 420 | 729 | 468 |
| Heat Rate, Btu/kWh | 5722 | 3740 | 3753 | 3720 |
| Energy Ratio | 0.7 | 0.7 | 0.73 | 0.564 |

Although it is preferred to extract air from the expander 88 and inject it upstream of the combustor 84, it can be appreciated that the systems 40 and 40' can operate without providing any airflow from the expander 88 upstream of the combustor 84 by closing valve 100. Also, airflow can be provided from the expander 88 upstream of the combustor 84 together with, or separate from, compressed air sent directly to the combustor 84 from the air storage 66. Still further, electric power can be provided only via the expander 88 and generator 94 if desired by opening valve 98 and closing valve 86.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of providing a Compressed Air Energy Storage (CAES) system from first and second combustion turbine assemblies, the method comprising the steps of:
   providing a first combustion turbine assembly having a debladed turbine element, a compressor, and a motor for driving the compressor,
   providing an air storage,
   providing a flow path such that compressed air from an outlet of the compressor communicates with the air storage instead of with the turbine element,
   providing a second combustion turbine assembly having a debladed compressor, a combustor, a turbine associated with the combustor, and a generator associated with the turbine,
   providing a flow path such that compressed air from the air storage communicates with the combustor and thus the turbine of the second combustion turbine assembly instead of with air from the compressor of the second combustion turbine assembly so that the turbine can expand the compressed air from the air storage to produce electrical power via the generator,
   providing an expander and an additional generator associated with the expander, and
   providing a flow path such that compressed air from the air storage can be preheated and then can communicate with the expander, in addition to selectively directly communicate with the combustor and thus the turbine of the second combustion turbine assembly and providing a flow path such that airflow from the expander can communicate with the combustor and thus the turbine of the second turbine assembly, so that the expander can expand the preheated compressed air to produce electrical power via the additional generator, in addition to the electrical power produced by the generator of the second combustion turbine assembly.

2. The method of claim 1, further comprising:
   coupling an additional compressor to the first combustion turbine assembly, the additional compressor having an input connected to an output of the compressor of the first combustion turbine assembly, an output of the additional compressor being connected to the air storage.

3. The method of claim 2, further comprising:
   providing an electric motor to drive the additional compressor.

4. The method of claim 1, further comprising:
   coupling a first thrust bearing to a shaft of the first combustion turbine assembly to compensate for the deblading of the turbine element, and
   coupling a second thrust bearing to a shaft of the second combustion turbine assembly to compensate for the deblading of the compressor of the second combustion turbine assembly.

5. The method of claim 2, further comprising:
   inserting an intercooler between the output of the compressor of the first combustion turbine assembly and an input of the additional compressor; and
   inserting an aftercooler between an output of the additional compressor and the air storage.

6. The method of claim 1, further providing that a portion of airflow can be extracted from the expander and injected upstream of the combustor of the second combustion turbine assembly and that the expander can expand the preheated compressed air to atmospheric pressure.

7. The method of claim 1, further providing that all exhaust airflow from the expander can be received by the combustor and thus the turbine of the second combustion turbine assembly.

8. The method of claim 1, further comprising:
   providing a recuperator between the air storage and the expander, and
   providing a flow path such that the recuperator can receive a source of heat to preheat the compressed air being received by the expander.

9. The method of claim 1, wherein the source of heat is exhaust from the turbine of the second combustion turbine assembly.

* * * * *